United States Patent
Mitsuhashi (10) Patent No.: US 8,231,176 B2
(45) Date of Patent: Jul. 31, 2012

(54) ROTATION PREVENTION DEVICES OF VEHICLE SEAT

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 318 days.

(21) Appl. No.: 12/672,305

(22) PCT Filed: Apr. 7, 2008

(86) PCT No.: PCT/JP2008/056864
§ 371 (c)(1),
(2), (4) Date: Mar. 16, 2010

(87) PCT Pub. No.: WO2009/019908
PCT Pub. Date: Feb. 12, 2009

(65) Prior Publication Data
US 2011/0193391 A1 Aug. 11, 2011

(30) Foreign Application Priority Data
Aug. 8, 2007 (JP) .................................. 2007-206215

(51) Int. Cl.
*B60N 2/02* (2006.01)
(52) U.S. Cl. ............... 297/367 R; 297/366; 297/378.12
(58) Field of Classification Search ............... 297/367 R, 297/366, 378.12
See application file for complete search history.

(56) References Cited

U.S. PATENT DOCUMENTS

| | | | |
|---|---|---|---|
| 7,828,385 B2 * | 11/2010 | Reubeuze | 297/366 |
| 8,002,352 B2 * | 8/2011 | Yamada et al. | 297/366 |
| 2002/0043852 A1 * | 4/2002 | Uramichi | 297/366 |
| 2009/0256409 A1 | 10/2009 | Kuroda et al. | |
| 2010/0013288 A1 | 1/2010 | Mitsuhashi | |
| 2010/0026072 A1 | 2/2010 | Uramichi et al. | |
| 2010/0052393 A1 | 3/2010 | Mitsuhashi et al. | |

FOREIGN PATENT DOCUMENTS

| | | |
|---|---|---|
| JP | 2002-186535 | 7/2002 |
| JP | 2005-270298 | 10/2005 |
| JP | 2006-14942 | 1/2006 |
| JP | 2006-340872 | 12/2006 |

* cited by examiner

*Primary Examiner* — Laurie Cranmer
(74) *Attorney, Agent, or Firm* — Greenblum & Bernstein, P.L.C.

(57) ABSTRACT

An internal gear member and an external gear member of a reclining device are axially inserted into a cylindrical interior of a retainer member in order, so that the internal gear member that is inserted first faces a first bottom surface that is formed in an insertion direction side end periphery of the retainer member, and that the external gear member that is inserted later contacts a second bottom surface that is positioned closer to a reception side relative to the first bottom surface. A reception side end periphery of the retainer member is bent radially inwardly, so that the external gear member is integrated with the retainer member. A rear outer surface corresponding to a rear side surface of the first bottom surface of the retainer member has a radial width that corresponds to at least the sum of a radial width of the first bottom surface and a radial width of the second bottom surface.

2 Claims, 11 Drawing Sheets

ROTATION PREVENTION DEVICES OF VEHICLE SEAT

TECHNICAL FIELD

The present invention relates to a rotation prevention device of vehicle seat. More particularly, the present invention relates to a rotation prevention device of vehicle seat, which device includes two connecting members having at least disk-shaped portions that are relatively rotatably coupled to each other, and a retainer member that is capable of preventing the two connecting members from being axially disengaged.

BACKGROUND ART

A vehicle seat having a reclining device (a rotation prevention device) is conventionally known. In the vehicle seat, a seat back is rotatably connected to a seat cushion via the reclining device such that a tilt angle of the seat back can be adjusted. Such a reclining device is taught by Japanese Laid-Open Patent Publication Number 2006-14942. The reclining device described therein includes a disk-shaped ratchet having an internal gear wheel, a disk-shaped guide having an external gear wheel, and a retainer member that is capable of maintaining a condition in which the ratchet and the guide are axially assembled.

The retainer member is formed to a shouldered cylindrical shape. The ratchet and the guide are disposed in the cylindrical retainer member. Thus, the retainer member can be attached to the ratchet and the guide while circumferentially encircling the same. In particular, the retainer member has a support surface portion. The support surface portion is formed in one end periphery of the cylindrical retainer member by folding the periphery radially inwardly so as to have a flange shape. Therefore, when the ratchet and the guide are disposed in the cylindrical retainer member in order, an outer disk surface of the latchet can face the support surface portion.

After the ratchet and the guide are disposed in the retainer member, a reception side end periphery of the retainer member is bent radially inwardly. As a result, the ratchet and the guide can be clamped from both sides, so as to not be axially separated from each other.

According to the conventional art described above, the retainer member has the shouldered shape, so as to circumferentially encircle the ratchet and the guide that respectively have different diameters. Therefore, when the reception side end periphery of the retainer member is bent, the support surface portion formed in the opposite end periphery of the retainer member cannot have a sufficient support area that can be supported by a support die.

Thus, there is a need in the art to ensure a wide support area of a support die when an end periphery of the retainer member is bent.

SUMMARY OF THE INVENTION

A rotation prevention device of vehicle seat of the present invention includes two connecting elements coupled to each other so as to be rotatable relative to each other, the connecting elements each having at least a disk-shaped portion, and a retainer member that is capable of preventing the two connecting elements from being axially separated from each other. The two connecting elements are capable of being switched between a relatively rotatable condition and a relatively unrotatable condition depending on an operational condition of a rotation prevention mechanism disposed therebetween. The retainer member has a shouldered cylindrical shape, so as to couple the two connecting elements having different diameters while circumferentially encircling at least a portion of the connecting elements. The connecting elements are axially inserted into a cylindrical interior of the retainer member in order, so that one of the connecting elements that is inserted first faces a first bottom surface that is formed in an insertion direction side end periphery of the retainer member, and that the other of the connecting elements that is inserted later contacts a second bottom surface that is formed in the retainer member so as to be positioned closer to a reception side relative to the first bottom surface. A reception side end periphery of the retainer member is bent radially inwardly while the connecting elements are coupled, so that the other of the connecting elements is integrated with the retainer member. Further, a rear side surface of the first bottom surface of the retainer member has a radial width that corresponds to the sum of at least a radial width of the first bottom surface and a radial width of the second bottom surface.

According to the structure of the present invention, the rear side surface of the first bottom surface of the retainer member is formed to be axially faced. Therefore, the rear outer surface may function as a support surface that is supported by a support die when the reception side end periphery is bent. The rear side surface of the first bottom surface has the radial width that correspond to the sum of at least the radial width of the first bottom surface and the radial width of the second bottom surface. Therefore, a wide support area that can be supported by the support die can be obtained without increasing an outer diameter of each of the connecting elements.

The present invention can be constructed as follows. That is, an outer circumferential surface of a cylindrical portion of the retainer member is axially linearly extended from the reception side end periphery to the insertion direction side end periphery. Further, an inner area defined by the linearly extended outer circumferential surface and an inner circumferential surface including the first and bottom surfaces is solid in cross section.

According to the structure of the present invention, because the inner area defined by the outer circumferential surface and the inner circumferential surface is solid in cross section, a surface portion that constitutes the rear side surface of the first bottom surface may have an increased thickness. As a result, the surface portion having the increased thickness has increased rigidity and strength. That is, the surface portion has increased support rigidity and support strength to support the support die. Therefore, the reception side end periphery of the retainer member can be more suitably bent.

BEST MODE FOR CARRYING OUT THE INVENTION

In the following, best mode of embodiments for carrying out the present invention will be described with reference to the drawings. In the embodiments, rotation prevention devices of vehicle seat of the present invention are exemplified as reclining devices that rotatably connect a seat back to a seat cushion such that a tilt angle of the seat back can be adjusted.

Embodiment 1

First, the rotation prevention devices of vehicle seat of Embodiment 1 will be described with reference to FIGS. 1 to 8. FIG. 3 schematically shows a structure of a vehicle seat 1 of the present invention. In the vehicle seat 1, the seat back 2 is connected to the seat cushion 3 via a pair of reclining devices 4 and 4 that are disposed on both side lower portions of the seat back 2. The reclining devices 4 and 4 correspond to the rotation prevention devices of vehicle seat of the present invention.

Each of the reclining devices 4 and 4 is normally maintained in a condition in which a tilting angle of the seat back 2 is fixed. However, each of the reclining devices 4 and 4 is constructed to rotate and adjust the tilting angle of the seat back 2 when operating shafts 4c and 4c inserted thereinto are rotated. The operating shafts 4c and 4c are integrally connected to each other via a connection rod 4r. Therefore, when one of the operating shafts 4c and 4c is rotated by an electric motor (not shown), the other of the operating shafts 4c and 4c is rotated in synchrony therewith.

Further, the electric motor described above is constructed to be turned on and off and to be switched between normal and reverse rotational modes by operating a switch that is attached to, for example, a side portion of the vehicle seat 1. When the reclining devices 4 and 4 are positioned in conditions in which the operating shafts 4c and 4c are not rotated, the reclining devices 4 and 4 are maintained in conditions in which the tilting angle of the seat back 2 is fixed to a desired angle. To the contrary, when the operating shafts 4c and 4c are rotationally moved by actuation of the electric motor, the reclining devices 4 and 4 are rotated, so as to change the tilting angle of the seat back 2.

Next, structures of the reclining devices 4 and 4 described above will now be described. As will be appreciated, the reclining devices 4 and 4 respectively have the substantially same construction as each other with the exception of one aspect that they are symmetrically formed. Therefore, the reclining device 4 that is disposed on the right side in FIG. 3 will be described hereinafter.

Figure 1:
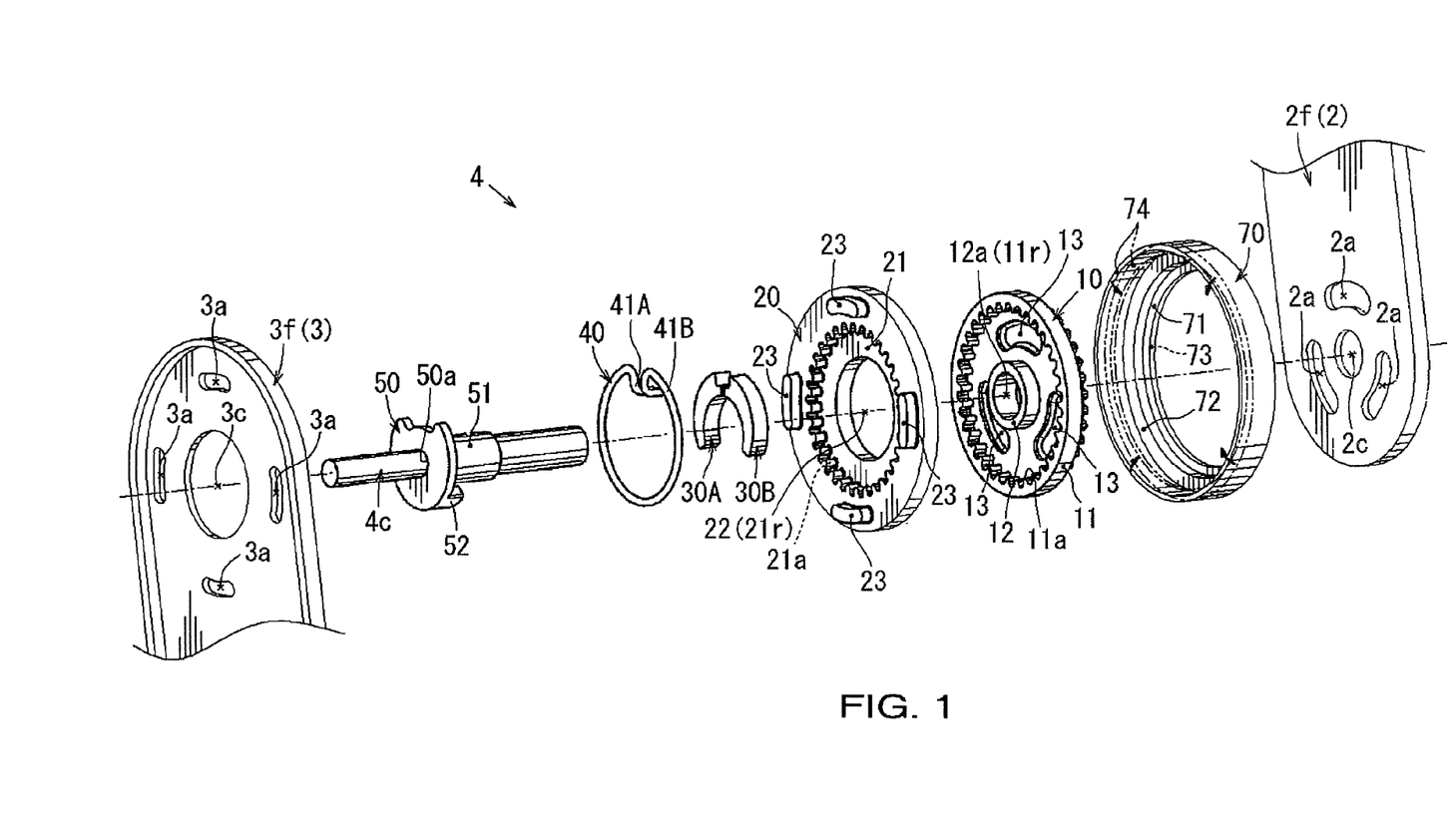
FIG. 1 is an exploded perspective view of a reclining device according to Embodiment 1.
Figure 2:
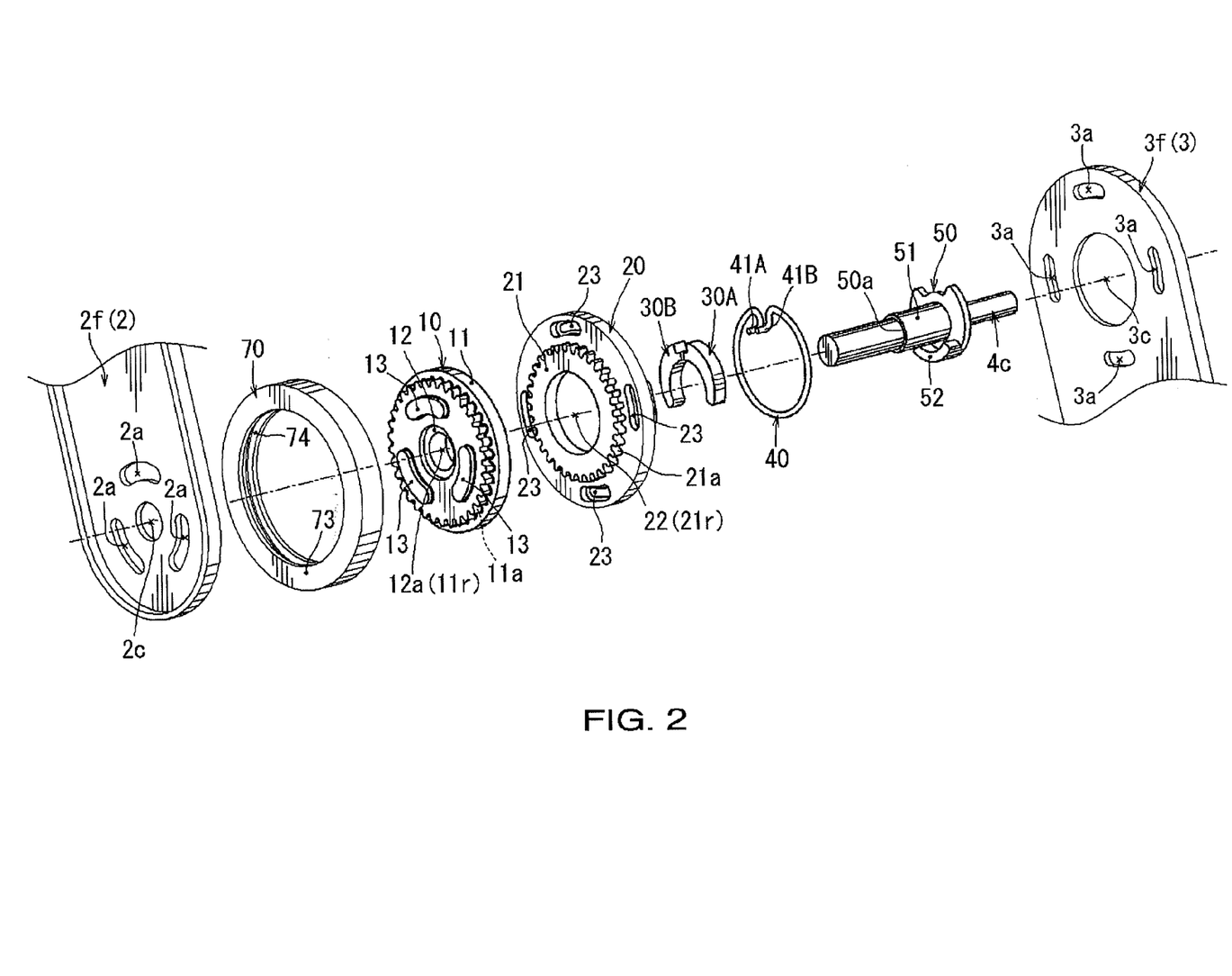
FIG. 2 is an exploded perspective view of the reclining device, which is viewed from a direction opposite to the direction in FIG. 1.
Figure 3:
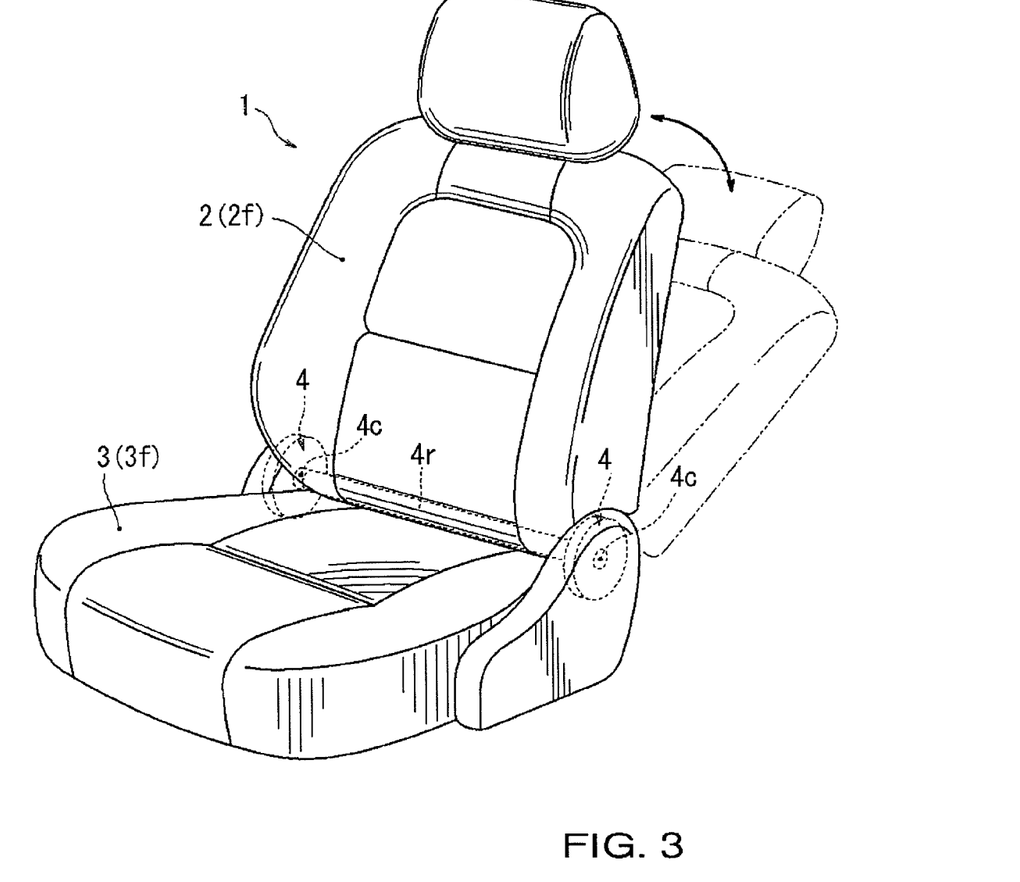
FIG. 3 is a schematic view of a vehicle seat.

As shown in FIGS. 1 and 2, the reclining device 4 includes a disk-shaped internal gear member 10, a disk-shaped external gear member 20, a pair of piece-shaped eccentric members 30A and 30B, an open ring-shaped spring member 40, a operating member 50 constructed as a rotary disk, a round rod-like operating shaft 4c, and a cylindrical retainer member 70, which are assembled as a unit. Further, the internal gear member 10 corresponds to one of connecting elements of the present invention. Conversely, the external gear member 20 corresponds to the other of the connecting elements of the present invention.

Figure 4:
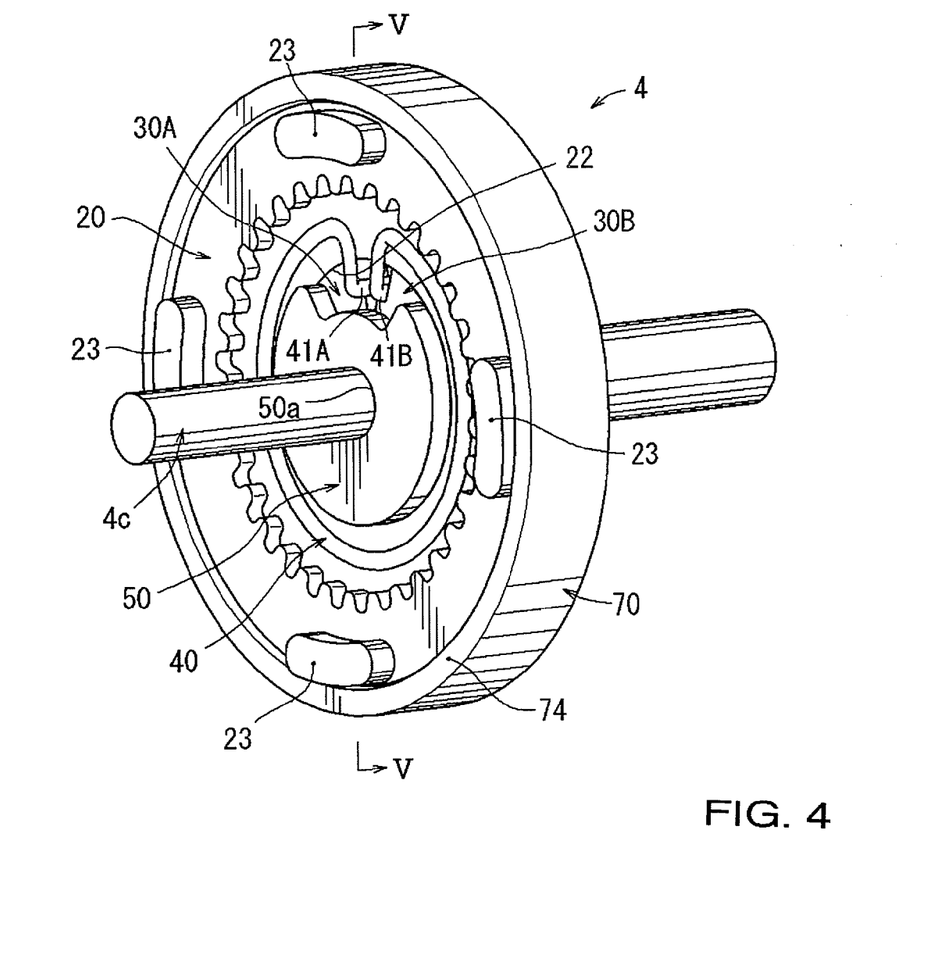
FIG. 4 is a perspective view of the reclining device, which illustrates an assembled condition.

These components are made of steel except for the operating member 50 that is made of resin. Further, these components are axially set in order after the internal gear member 10 is first introduced into a cylindrical interior of the retainer member 70, so as to be assembled as a unit (FIG. 4). Structures of the components described above will be described in detail hereinafter.

First, a structure of the internal gear member 10 will be described with reference to FIGS. 1 and 2. The disk-shaped internal gear member 10 is shaped by half die cutting the same in a thickness direction (an axial direction) such that an outer circumferential peripheral portion thereof can be cylindrically projected. The cylindrically projected portion includes inwardly-faced teeth 11a that are formed in an inner circumferential surface thereof. That is, the cylindrically projected portion is formed as an internal gear wheel 11. Further, the internal gear member 10 has a cylindrical portion 12 formed in a central portion thereof. The cylindrical portion 12 is projected in the same thickness direction as the internal gear wheel 11.

The cylindrical portion 12 has an axis that is aligned with an axis 11r of the internal gear member 10 (the internal gear wheel 11). The cylindrical portion 12 has a circular shaft insertion bore 12a that is penetrated therethrough. As shown in FIG. 2, an outer disk surface of the internal gear member 10 is joined to a plate surface of a back frame 2f of the seat back 2, so that the internal gear member 10 is integrally affixed to the back frame 2f.

Further, the internal gear member 10 has oval-shaped dowels 13. that are respectively formed in a disk-shaped portion thereof so as to be projected from the outer disk surface thereof. (Symbol "." means plural number.) The dowels 13. are formed in three positions on an outer circumferential periphery of the disk-shaped portion so as to extend therealong. Conversely, the back frame 2f has dowel insertion holes 2a. that are penetrated therethrough in the thickness direction. The dowel insertion holes 2a. are shaped such that the dowels 13. can be fitted thereinto. Therefore, the internal gear member 10 is securely integrally attached to the back frame 2f by fitting the dowels 13. to the dowel insertion holes 2a. and then welding fitted portions.

Thus, the dowels 13. and the dowel insertion holes 2a. that can be fitted to each other are formed so as to extend along the outer circumferential periphery of the disk-shaped portion. Therefore, the internal gear member 10 can be rigidly integrally attached to the back frame 2f with increased shear strength in the circumferential direction. Further, the back frame 2f has a circular shaft insertion bore 2c that is penetrated therethrough in a thickness direction. The shaft insertion bore 2c is shaped to have the same diameter as the shaft insertion bore 12a formed in the internal gear member 10. The shaft insertion bores 12a and 2c are shaped such that the round rod-like operating shaft 4c can be inserted thereinto, which will be described hereinafter.

Next, with reference to FIG. 1 again, a structure of the external gear member 20 will be described. The external gear member 20 is formed as a disk-shaped member having a diameter greater than the diameter of the internal gear member 10. The external gear member 20 is shaped by half die cutting the same in a thickness direction (an axial direction)

such that a disk-shaped central portion thereof can be cylindrically projected. The cylindrically projected portion includes outwardly-faced teeth 21a that are formed in an outer circumferential surface thereof. The cylindrically projected portion is formed as an external gear wheel 21. Further, the external gear wheel 21 has a diameter smaller than the diameter of the internal gear wheel 11 formed in the internal gear member 10.

Therefore, when the external gear member 20 thus constructed is coupled to the internal gear member 10 while the external gear wheel 21 meshes with the internal gear wheel 11, the external gear member 20 and the internal gear member 10 can be mutually supportively assembled, so as to be rotated relative to each other while changing a meshing position therebetween. Further, the external gear member 20 has an enlarged opening 22 having a diameter greater than the shaft insertion bore 12a formed in the central portion of the internal gear member 10 described above. The enlarged opening 22 is formed in the central portion of the external gear member 20. The enlarged opening 22 has an axis that is aligned with an axis 21r of the external gear member 20 (the external gear wheel 21).

Figure 5:
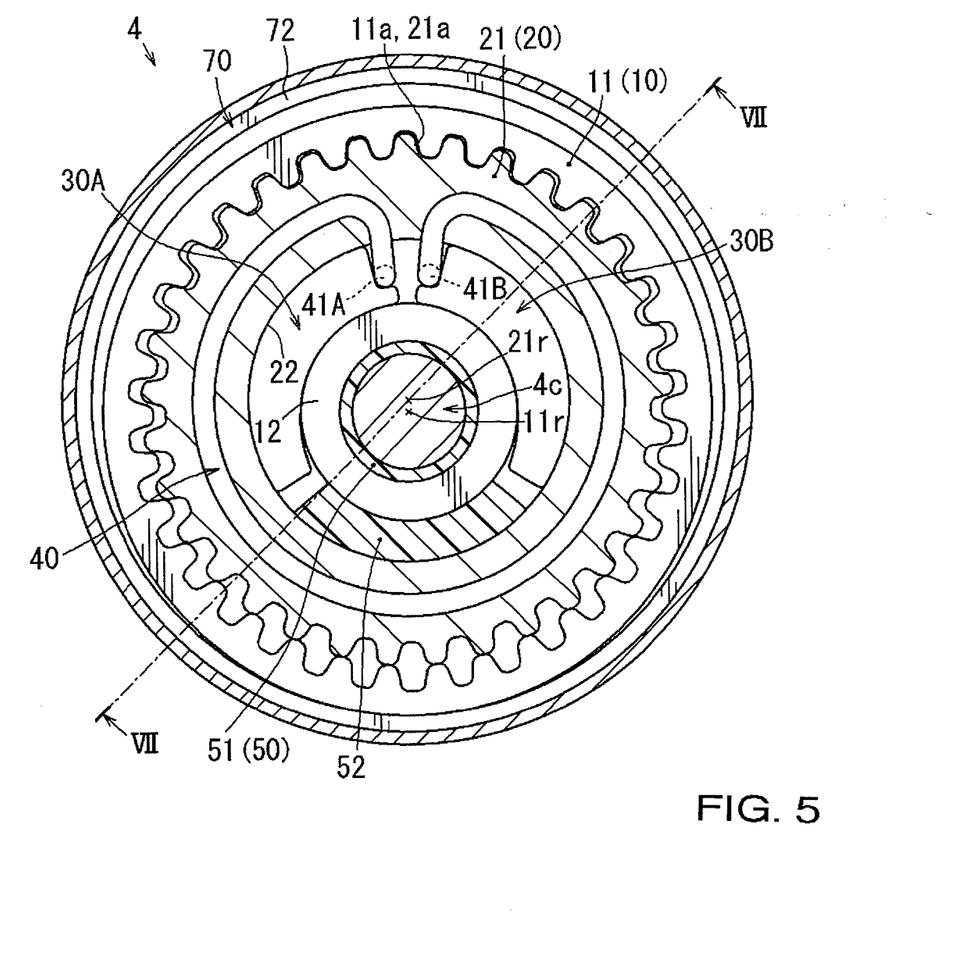
FIG. 5 is a cross-sectional view taken along line V-V in FIG. 4.

Therefore, as shown in FIG. 1, the external gear member 20 is coupled to the internal gear member 10 while the cylindrical portion 12 formed in the internal gear member 10 is positioned within the enlarged opening 22. Further, the external gear member 20 is coupled to the internal gear member 10 while the axes 21r and 11r thereof are offset from each other (FIG. 5). Further, the external gear wheel 21 is constructed to have teeth number fewer than the teeth number of the internal gear wheel 11. In particular, the teeth number of the teeth 21a of the external gear wheel 21 is thirty three whereas the teeth number of the teeth 11a of the internal gear wheel 11 is thirty four.

Figure 6:
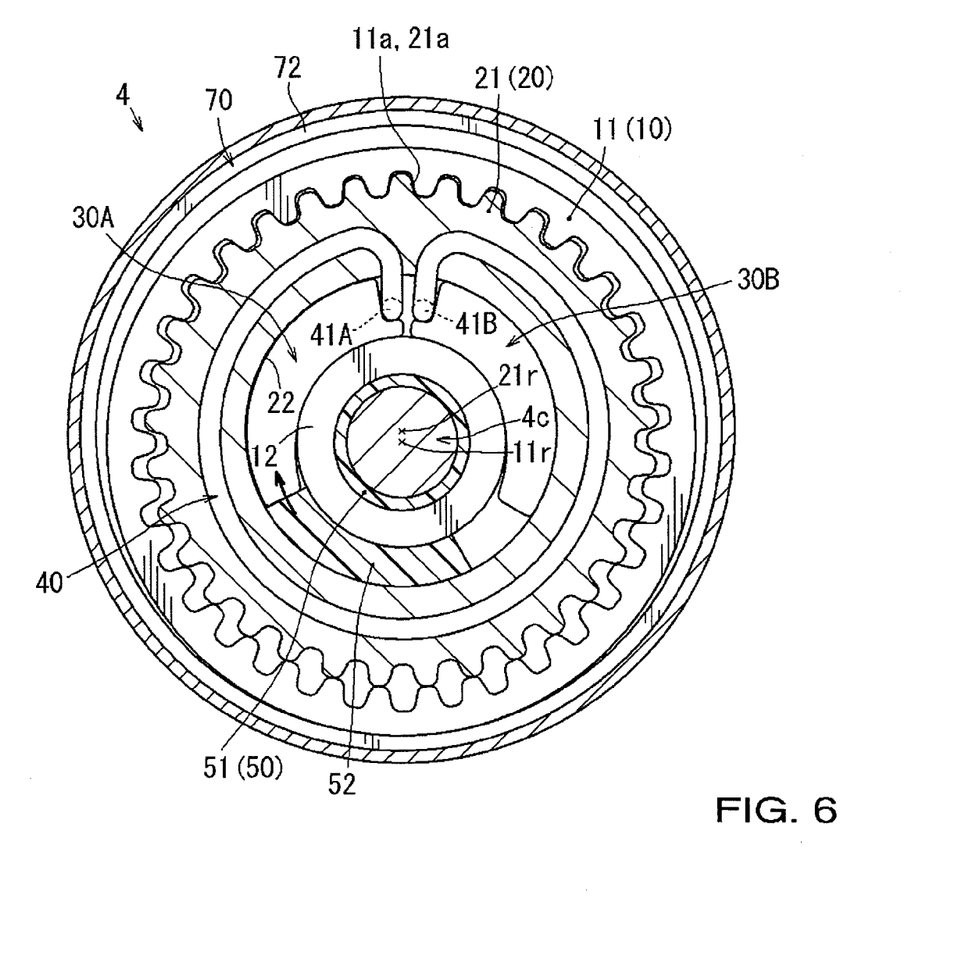
FIG. 6 is a cross-sectional view, which illustrates a condition in which the reclining device is rotated from a condition shown in FIG. 5.

Therefore, as shown in FIG. 5, when relative revolving motion is performed between the external gear wheel 21 and the inner circumferential surface of the internal gear wheel 11 while the meshing position therebetween is changed, a rotational posture of the external gear member 20 relative to the internal gear member 10 can be gradually changed due to the difference of the teeth number of the gear wheels 21 and 11. In particular, as shown in FIG. 6, when the external gear wheel 21 is relatively revolved, for example, clockwise along the inner circumferential surface of the internal gear wheel 11, the external gear member 20 can rotate counterclockwise relative to the internal gear member 10, so that the rotational posture thereof can be changed However, the internal gear member 10 is connected to the back frame 2f. Conversely, the external gear member 20 is connected to the cushion frame 3f, which will be described hereinafter. Therefore, actually, the internal gear member 10 can rotate relative to the external gear member 20 while changing the meshing position therebetween. As a result, when rotational motion between the external gear wheel 21 and the internal gear wheel 11 is performed described above, as shown in FIG. 3, the tilting angle of the seat back 2 can be adjusted.

As shown in FIG. 1, an outer disk surface of the external gear member 20 is joined to a plate surface of a cushion frame 3f, so that the external gear member 20 is integrally affixed to the cushion frame 3f. In particular, the external gear member 20 has oval-shaped dowels 23. that are respectively formed in a disk-shaped portion thereof so as to be projected from the outer disk surface thereof. The dowels 23. are formed in four positions on an outer circumferential periphery of the disk-shaped portion so as to extend therealong. Conversely, the cushion frame 3f has dowel insertion holes 3a. that are penetrated therethrough in the thickness direction. The dowel insertion holes 3a. are shaped such that the dowels 23. can be fitted thereinto.

Therefore, the external gear member 20 is securely integrally attached to the cushion frame 3f by fitting the dowels 23. to the dowel insertion holes 3a. formed in the cushion frame 3f and then welding fitted portions. Further, the cushion frame 3f has a circular enlarged opening 3c that is penetrated therethrough in a thickness direction. The enlarged opening 3c is shaped to have the same diameter as the enlarged opening 22 formed in the external gear member 20 described above. The enlarged opening 3c are shaped such that the round rod-like operating shaft 4c and the operating member 50 can be inserted thereinto, which will be described hereinafter.

Next, with reference to FIG. 1 again, structures of the eccentric members 30A and 30B will be described. The eccentric members 30A and 30B are formed as arcuate piece-shaped members that are symmetrically curved. The eccentric members 30A and 30B are assembled while they are received in the enlarged opening 22 formed in the external gear member 20 described above. Thus, the eccentric members 30A and 30B are disposed in an eccentric space that is formed between an inner circumferential surface of the enlarged opening 22 and an outer circumferential surface of the cylindrical portion 12 of the internal gear member 10 described above.

In particular, as shown in FIG. 5, the eccentric members 30A and 30B are respectively arcuately tapered so as to be oppositely introduced into a narrowing space portion formed between the enlarged opening 22 of the external gear member 20 and the cylindrical portion 12 of the internal gear member 10 (a narrowing space portion positioned in a lower side in FIG. 5). Further, engagement end portions 41A and 41B of the open ring-shaped spring member 40 is attached to the eccentric members 30A and 30B while straddling the same. Therefore, the eccentric members 30A and 30B are constantly biased by a biasing force of the spring member 40, so as to be maintained in a condition in which tapered lower end portions thereof are introduced into the above-described narrowing space portion.

Thus, due to the biasing force described above, the external gear member 20 can normally be maintained in a condition in which it is upwardly biased with respect to the cylindrical portion 12 by the eccentric members 30A and 30B, so that the external gear wheel 21 is pressed to the internal gear wheel 11 while meshing with each other without producing clearance (backrush) therebetween. Thus, due to a retention force thus produced, the external gear member 20 can be maintained in an unrotatable condition in which the external gear member 20 is prevented from rotating relative to the internal gear member 10.

However, the unrotatable condition due to biasing of the eccentric members 30A and 30B can be released by rotating the operating shaft 4c. As shown in FIG. 1, the operating shaft 4c is inserted into a through insertion bore 50a that is formed in a cylindrical portion 51 of the operating member 50 that is constructed as the rotary disk. As a result, the operating shaft 4c is secured to the operating member 50 so as to be integrally rotated therewith.

The operating member 50 has an arm portion 52 that is axially projected from a lower end portion of a collar portion formed therein. As shown in FIG. 5, the arm portion 52 is constructed so as to be disposed in the space that is positioned between the lower end portions of the eccentric members 30A and 30B described above. Thus, as shown in FIG. 6, when the operating member 50 is rotated, for example, clockwise, a bottom surface portion of the left eccentric member 30A can be pressed upwardly by the arm portion 52, so that the left eccentric member 30A can be rotated clockwise along the inner circumferential surface of the enlarged opening 22.

Upon rotational movement of the eccentric member 30A, the inner circumferential surface of the enlarged opening 22 is pressed, so that the external gear wheel 21 can rotate clockwise along the inner circumferential surface of the internal gear wheel 11 while changing the meshing position therebetween. Depending on this motion, the right eccentric member 30B can be rotationally moved clockwise due to the biasing force of the spring member 40 while it is introduced into the space portion that is widened due to the movement described above. Depending on the movement described above, as previously described with reference to FIG. 3, the seat back 2 can be rotated in a forward or backward tilting direction.

Further, as shown in FIG. 5, when rotational operation of the operating shaft 4c is stopped, the eccentric members 30A and 30B are placed again in the condition in which they are introduced into the narrowing space portion by the biasing force of the spring member 40, so that the reclining device 4 can be placed in a condition in which it is prevented from rotating.

Next, with reference to FIG. 1 again, the retainer member 70 will be described. The retainer member 70 is formed by forging a round rod-shaped forging material (Material: S10C or other such materials) and has a cylindrical shape in appearance. In particular, the retainer member 70 has a shouldered flange-shaped surface portion. The flange-shaped surface portion is formed in a back side end of the retainer member 70 so as to extend radially inwardly. As a result, a first annular bottom surface 71 and a second annular bottom surface 72 are formed in an inner circumferential surface of the retainer member 70. The first and second bottom surfaces 71 and 72 are respectively axially displaced in juxtaposition and function as axially faced seat surfaces.

Figure 7:
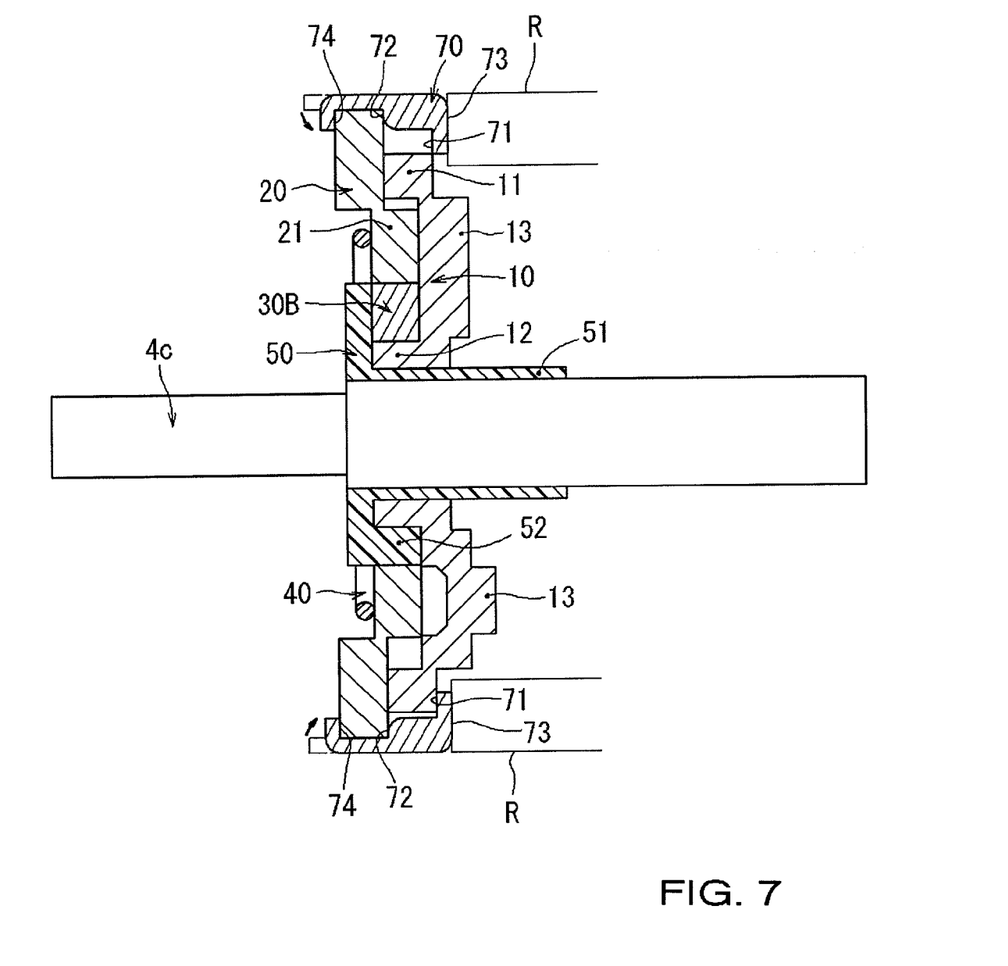
FIG. 7 is a cross-sectional view taken along line VII-VII in FIG. 5.

As shown in FIG. 7, when the internal gear member 10 is axially inserted into the cylindrical interior of the retainer member 70, the first bottom surface 71 described above faces the outer disk surface of the internal gear member 10 along an outer circumferential peripheral side thereof. Conversely, when the external gear member 20 is axially inserted into the cylindrical interior of the retainer member 70 after the internal gear member 10 is inserted thereinto, the second bottom surface 72 faces an inner disk surface of the external gear member 20 along an outer circumferential peripheral side thereof.

Thus, the internal gear member 10 and the external gear member 20 inserted into the cylindrical interior of the retainer member 70 can be axially positioned by the first bottom surface 71 and the second bottom surface 72 that are axially held thereagainst. Next, in a condition in which the internal gear member 10 and the external gear member 20 are axially positioned, a reception side end periphery, i.e., a left end periphery, of the retainer member 70 is bent radially inwardly, so as to from an axially faced bent surface 74. Thus, the internal gear member 10 and the external gear member 20 are coupled to each other via the retainer member 70, so as to be prevented from being axially separated from each other.

At this time, the reception side end periphery of the retainer member 70 is bent while a rear outer surface 73 is supported by a support die R. Further, the rear outer surface 73 corresponds to a rear side surface of the first bottom surface 71 that forms an end surface positioned opposite to the end periphery to be bent. The rear outer surface 73 has a radial width that correspond to the sum of a radial width of the first bottom surface 71 and a radial width of the second bottom surface 72 and is formed as an axially faced annular surface. Further, an outer circumferential surface of a cylindrical portion of the retainer member 70 is axially linearly extended from the reception side end periphery to an insertion direction side end periphery.

Thus, in the retainer member 70, the outer circumferential surface and the rear outer surface 73 described above are perpendicular to each other, and an inner area defined by these surfaces and the shouldered inner circumferential surface is solid in cross section. Therefore, a bending force can be applied to the reception side end periphery while the rear outer surface 73 having a wide radial width is supported by the support die R. Therefore, the reception side end periphery can be suitably bent.

Further, in the retainer member 70, as described above, because the inner area defined by the outer circumferential surface and the inner circumferential surface is solid in cross section, the flange-shaped surface portion that constitutes the rear outer surface 73 has an increased thickness. As a result, the flange-shaped surface portion having the increased thickness has increased rigidity and strength. That is, the flange-shaped surface portion has increased support rigidity and support strength to support the support die R. Therefore, the retainer member 70 cannot be easily deformed during a bending operation, so that the end periphery described above can be more suitably bent.

Thus, the end periphery of the retainer member 70 can be bent with a high degree of accuracy. Therefore, the bent end periphery of the retainer member 70 can be crimped against the outer disk surface of the external gear member 20 while a small clearance is formed between the outer disk surface of the internal gear member 10 and the first bottom surface 71 of the retainer member 70, so that the gear members 10 and 20 can be integrated with a high degree of accuracy. That is, a clearance formed between the outer disk surface of the internal gear member 10 and the first bottom surface 71 of the retainer member 70 can be prevented from being excessively widened, so that the internal gear member 10 can be avoided from being rattled. Conversely, the clearance can be prevented from being excessively narrowed, so that relative rotation (slide rotation) of the internal gear member 10 cannot be precluded.

In the rotation prevention device, i.e., the reclining device 4 of the present embodiment, the rear outer surface 73, i.e., the rear side surface of the first bottom surface 71 of the retainer member 70, is formed to be axially faced. Therefore, the rear outer surface 73 may function as a support surface that is supported by the support die R when the reception side end periphery is bent. The rear outer surface 73 has the radial width that correspond to the sum of the radial width of the first bottom surface 71 and the radial width of the second bottom surface 72. Therefore, a wide support area that can be supported by the support die R can be obtained without increasing an outer diameter of each of the internal gear member 10 and the external gear member 20.

Embodiment 2

Figure 8:
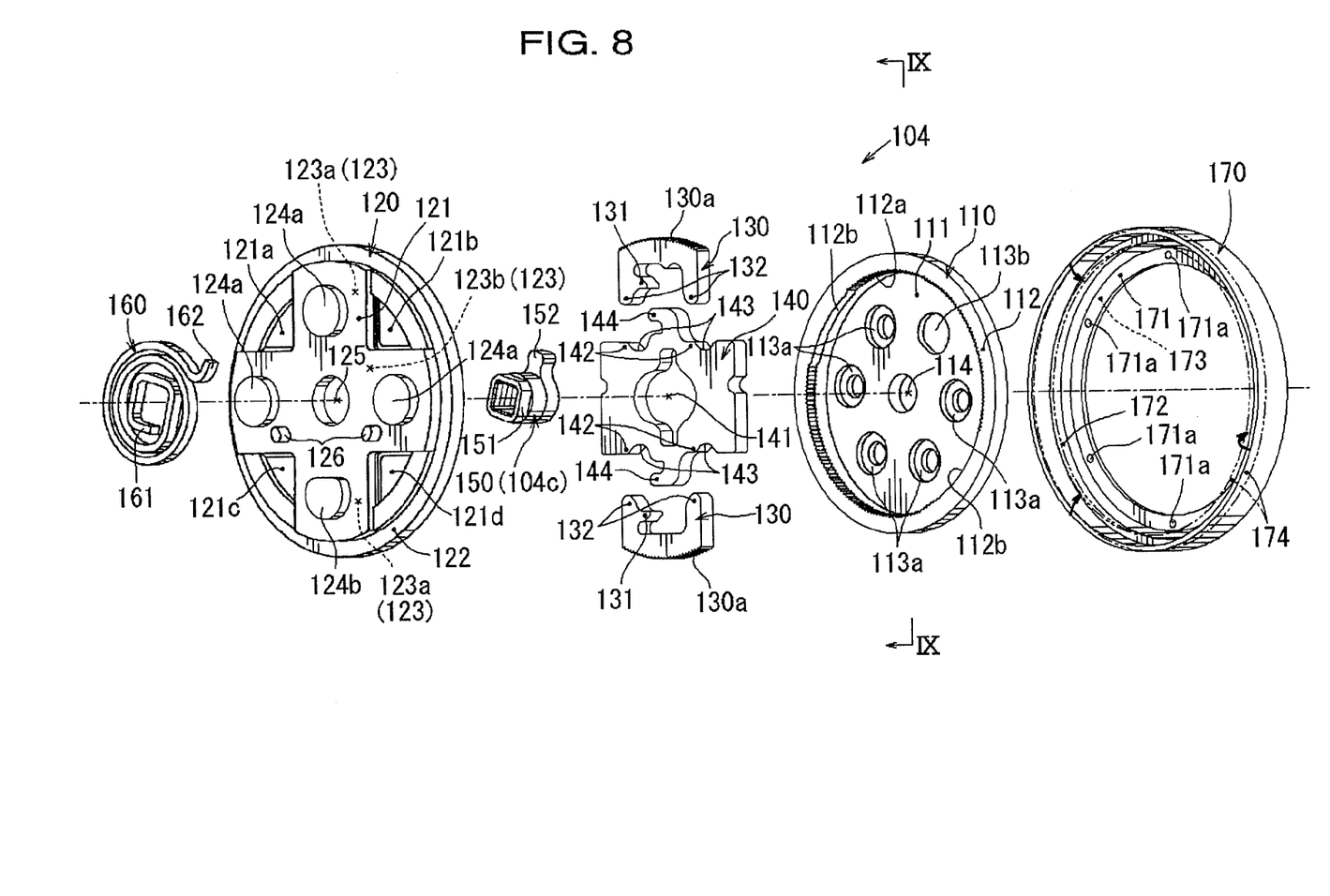
FIG. 8 is an exploded perspective view of a reclining device according to Embodiment 2.

Next, a rotation prevention device (a reclining device 104) of vehicle seat of Embodiment 2 will be described with reference to FIGS. 8 to 11. As shown in FIG. 8, the reclining device 104 includes a disk-shaped ratchet 110, a disk-shaped guide 120, a pair of pawls 130 and 130 that are vertically disposed between disk surfaces of the ratchet 110 and the guide 120, a slide cam 140 that is disposed between the disk surfaces of the ratchet 110 and the guide 120, a hinge cam 150 that is capable of sliding the slide cam 140, a biasing spring 160 that is capable of rotatably biasing the hinge cam 150, and a retainer member 170 that is capable of fastening the ratchet 110 and the guide 120 in a thickness direction (an axial direction), which are assembled as a unit.

Figure 9:
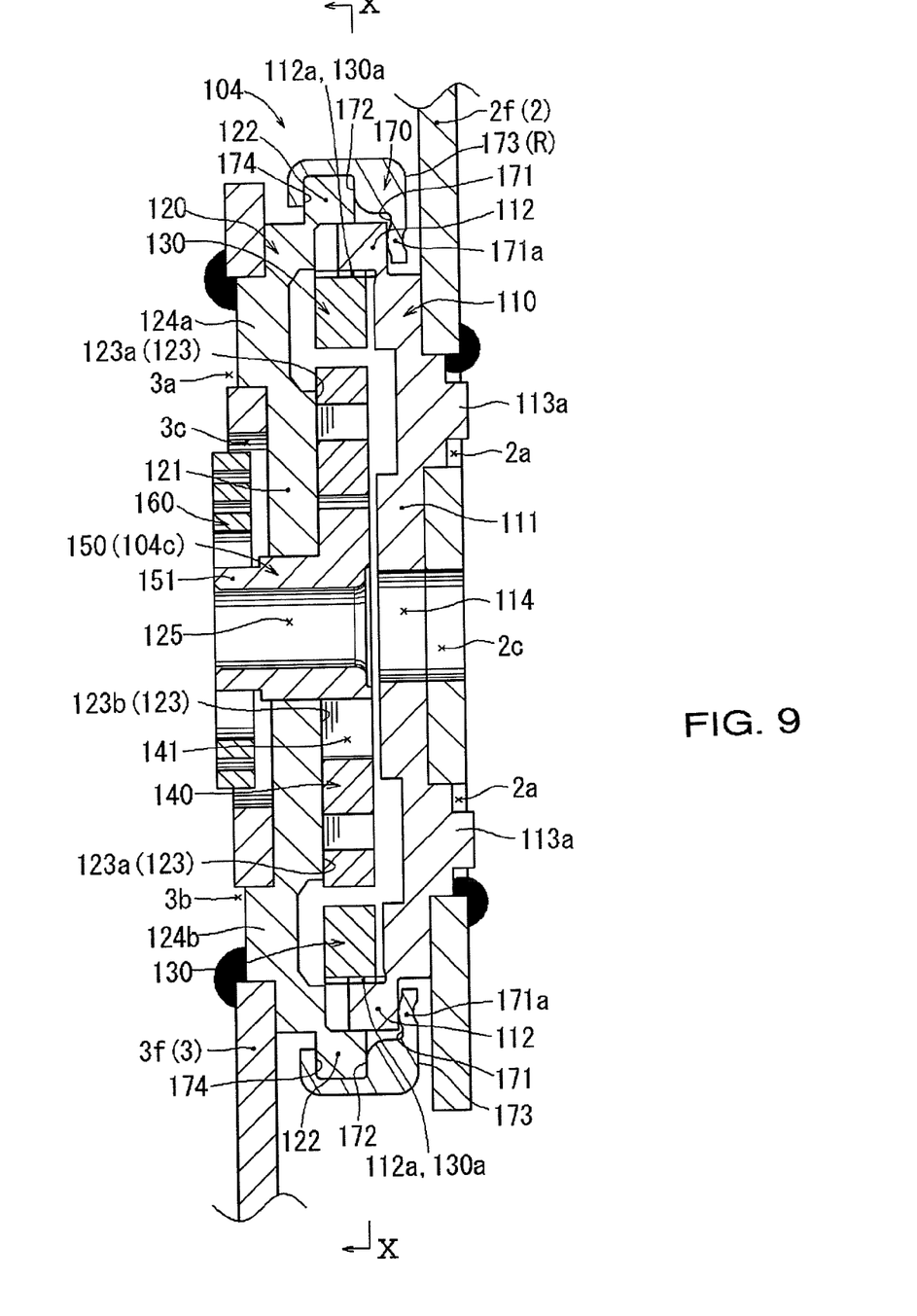
FIG. 9 is a cross-sectional view taken along line IX-IX in FIG. 8.

Further, the ratchet 110 corresponds to one of the connecting elements of the present invention. Conversely, the guide 120 corresponds to the other of the connecting elements of the present invention. As shown in FIG. 9, the above-described ratchet 110 is constructed such that an outer disk surface thereof can be integrally connected to the back frame 2f of the seat back 2. Conversely, the guide 120 is constructed such that an outer disk surface thereof can be integrally connected to the cushion frame 3f of the seat cushion 3.

In particular, as shown in FIG. 8, the ratchet 110 has a disk-shaped portion 111 and a cylindrical portion 112. The cylindrical portion 112 is projected from a circumferential periphery of the disk-shaped portion 111 in a thickness direction. The cylindrical portion 112 includes inwardly-faced toothed portions 112a and projected surface portions 112b that are formed in an inner circumferential surface thereof. The projected surface portions 112b are formed as flattened surfaces that are protruded radially inwardly than the inwardly-faced toothed portions 112a. Further, the projected surface portions 112b are axisymmetrically formed in two locations of the inner circumferential surface of the cylindrical portion 112.

Figure 10:
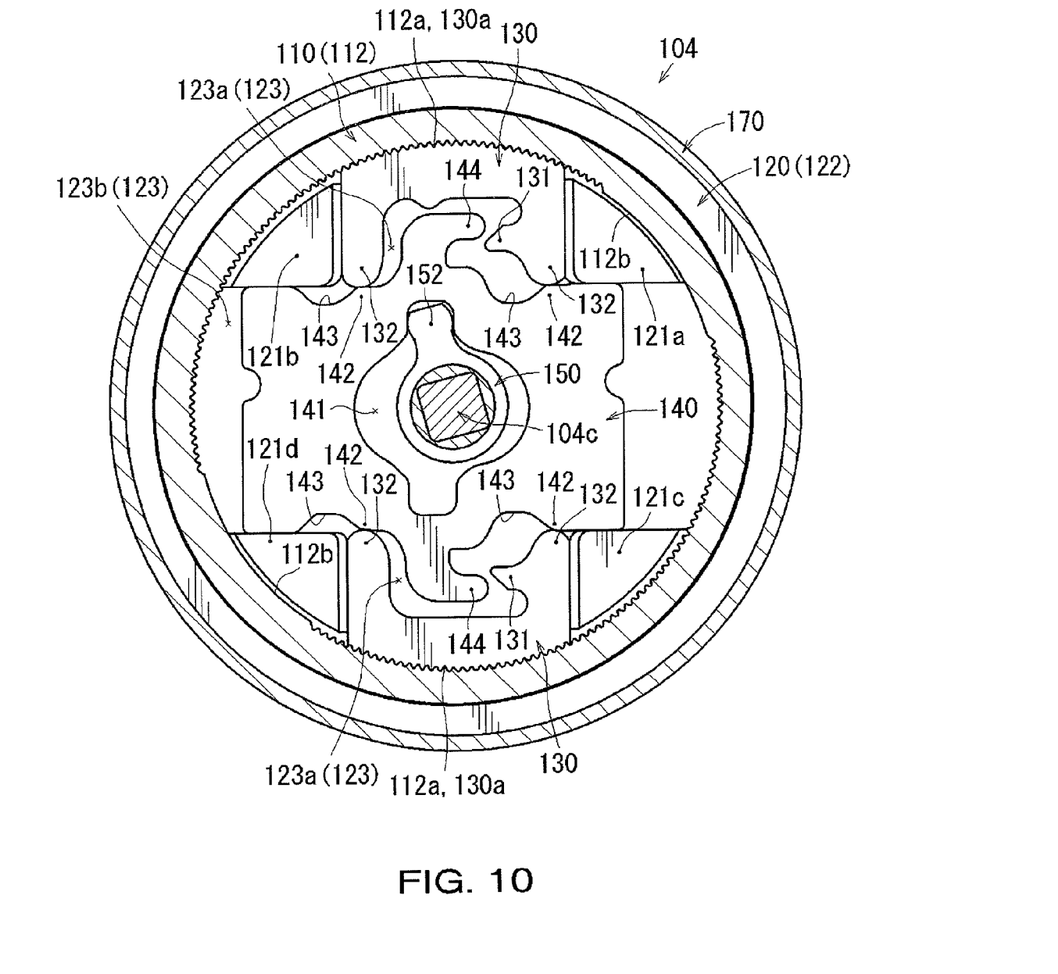
FIG. 10 is a cross-sectional view taken along line X-X in FIG. 9, which illustrates a condition in which the reclining device is locked.
Figure 11:
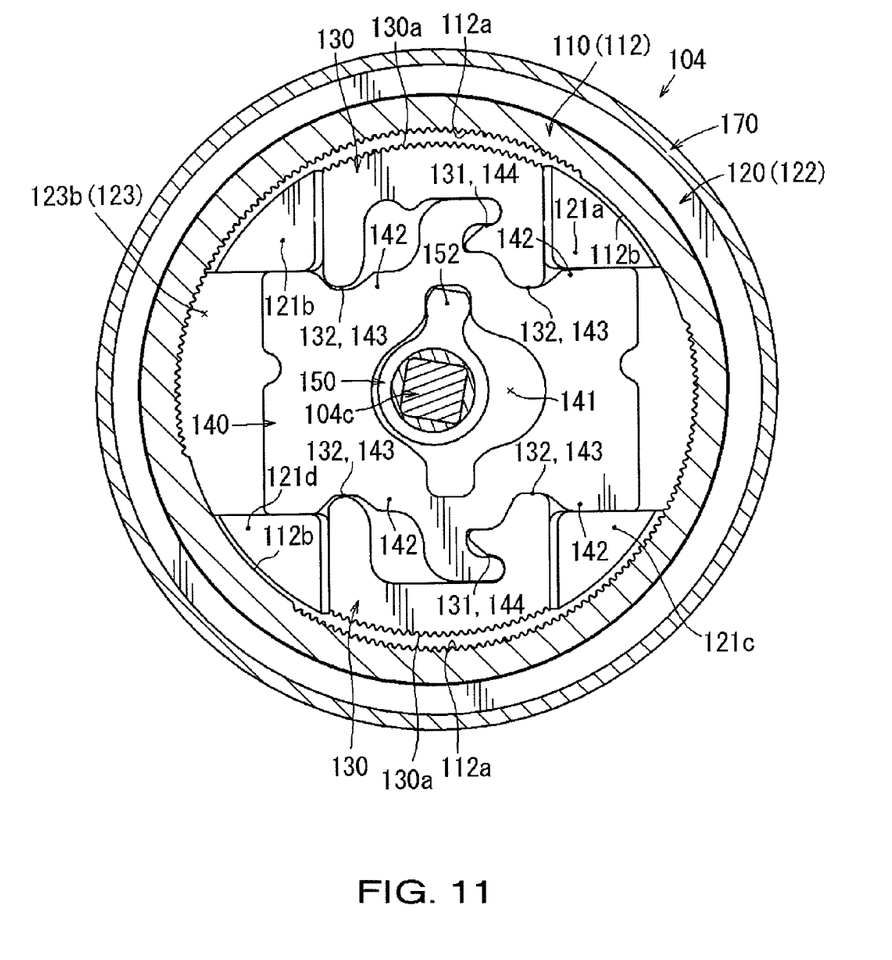
FIG. 11 is a cross-sectional view, which illustrates a condition in which the reclining device is unlocked.

As shown in FIGS. 10 to 11, circumferential angular ranges corresponding to the toothed portions 112a can be defined as an lockable rotational region in which the reclining device 104 can be locked due to engagement of the toothed portions 112a and the pawls 130 and 130, which will be described hereinafter. Conversely, circumferential angular ranges corresponding to the projected surface portions 112b can be defined as a free rotational region in which the reclining device 104 cannot be locked. With reference to FIG. 8 again, the ratchet 110 has a plurality of cylindrical dowels 113a. and a D-shaped dowel 113b that are respectively formed in the disk-shaped portion 111 thereof so as to be projected from the outer disk surface thereof.

The dowels 113a. and the D-shaped dowel 113b are formed as fitting portions that can securely integrally bond the ratchet 110 to the back frame 2f (FIG. 9) described above. The ratchet 110 has a through hole 114 that is formed in a central portion of the disk-shaped portion 111 thereof. The through hole 114 is shaped such that an operating shaft (not shown) for locking and unlocking the reclining device 104 can be inserted therethrough.

Next, with reference to FIG. 8 again, a structure of the guide 120 will be described. The guide 120 is formed as a disk-shaped member having a diameter greater than the diameter of the ratchet 110. The guide 120 has a disk-shaped portion 121 and a cylindrical portion 122. The cylindrical portion 122 is projected from a circumferential periphery of the disk-shaped portion 121 toward the ratchet 110 in a thickness direction. The cylindrical portion 122 is shaped to surround an outer circumferential periphery of the cylindrical portion 112 of the ratchet 110 described above.

In a condition in which the cylindrical portion 112 of the ratchet 110 is incorporated into the cylindrical portion 122, the guide 120 and the ratchet 110 can slidably rotate relative to each other while the cylindrical portions 112 and 122 are fitted to each other. Further, the guide 120 has a plurality of cylindrical dowels 124a. and a D-shaped dowel 124b that are respectively formed in the disk-shaped portion 121 thereof so as to be projected from the outer disk surface thereof. The dowels 124a. and the D-shaped dowel 124b are formed as fitting portions that can securely integrally bond the guide 120 to the cushion frame 3f (FIG. 9) described above.

The guide 120 has a through hole 125 that is formed in a central portion of the disk-shaped portion 121 thereof. The through hole 125 is shaped such that the operating shaft (not shown) can be inserted therethrough. Further, the guide 120 has a cross-shaped guide groove 123 that is formed in the disk-shaped portion 121 thereof by depressing an inner disk surface thereof in the thickness direction. In the guide groove 123, upper and lower groove portions thereof are respectively formed as pawl grooves 123a and 123a that are capable of receiving the pawls 130 and 130 therein.

As shown in FIGS. 10 to 11, the pawl grooves 123a and 123a are defined by guide walls 121a and 121b and guide walls 121c and 121d that can function as right and left walls, and are capable of guiding the pawls 130 and 130 so as to slide the same radially inwardly and outwardly of the guide 120 (upwardly and downwardly in the drawings) only therealong. Further, in the guide groove 123, right and left groove portions thereof and a central groove portion positioned therebetween are formed as a laterally continuous slide cam groove 123b that is capable of receiving the slide cam 140 therein.

The slide cam groove 123b is defined by the guide walls 121a and 121c and the guide walls 121b and 121d that can function as upper and lower walls, and is capable of guiding the slide cam 140 so as to slide the same radially inwardly and outwardly of the guide 120 (rightwardly and leftwardly in the drawings) only therealong. Further, the guide 120 has pin-shaped spring engagement portions 126 and 126 that are respectively formed in the disk-shaped portion 121 thereof so as to be projected from the outer disk surface thereof. The spring engagement portions 126 and 126 are respectively formed as functional elements to which an outer end 162 of the biasing spring 160 (a coil spring) is attached, which will be described hereinbefore. Further, the spring engagement portions 126 and 126 are positioned in circumferentially two locations, so that an attaching position of the outer end 162 of the biasing spring 160 can be changed.

Next, structures of the pawls 130 and 130 will be described. The pawls 130 and 130 are formed as piece-shaped members that are received in the pawl grooves 123a and 123a formed in the guide 120. The pawls 130 and 130 are formed vertically symmetrically with each other. In particular, an outer circumferential periphery of each of the pawls 130 and 130 is shaped to an arcuate shape so as to correspond to the inner circumferential surface of the cylindrical portion 112 of the ratchet 110. Further, the pawls 130 and 130 have outwardly-faced toothed portions 130a and 130a that are formed in an arcuately curved outer circumferential surface thereof and are capable of meshing with the inwardly-faced toothed portions 112a formed in the inner circumferential surface of the cylindrical portion 112 of the ratchet 110.

Therefore, when the pawls 130 and 130 are pressed by the slide cam 140 described hereinafter and are slid radially outwardly, the outwardly-faced toothed portions 130a and 130a can mesh with the inwardly-faced toothed portions 112a formed in the inner circumferential surface of the ratchet 110. As a result, the pawls 130 and 130 and the ratchet 110 can be circumferentially integrated with each other. However, the pawls 130 and 130 can only slide radially inwardly and outwardly with respect to the guide 120.

Therefore, the ratchet 110 can be prevented from relatively rotating with respect to the guide 120 via the pawls 130 and 130 meshing therewith. Thus, the reclining device 104 can be positioned in a locking condition. The locking condition of the reclining device 104 can be released when the pawls 130 and 130 are retracted radially inwardly and are disengaged from the ratchet 110.

The pawls 130 and 130 can be slid radially inwardly and outwardly when the slide cam 140 disposed between the pawls 130 and 130 is moved. The slide cam 140 is formed as a piece-shaped members that is capable being received in the slide cam groove 123b formed in the guide 120 described above. The slide cam 140 is vertically symmetrically shaped. In particular, the slide cam 140 has shoulder portions 142 and 142 that are capable of pushing the pawls 130 and 130 radially outwardly, and hooks 144 and 144 that are capable of pulling the pawls 130 and 130 radially inwardly. Further, the shoulder portions 142 and 142 and the hooks 144 and 144 are respectively formed in upper and lower peripheries of the slide cam 140.

The pawls 130 and 130 previously described are respectively formed as gate-shaped members in which radially inner sides thereof are partially removed. The pawls 130 and 130 respectively have gatepost-shaped leg portions 132 and 132. The pawls 130 and 130 can be pressed radially outwardly by the slide cam 140 when the leg portions 132 and 132 contact an upper peripheral surface portion and a lower peripheral surface portion of the slide cam 140. In particular, when the slide cam 140 is slid leftwardly in the drawings, the leg portions 132 and 132 can be positioned on the shoulder portions 142 and 142 of the slide cam 140, so that the pawls 130 and 130 can be maintained in a condition in which they are pushed radially outwardly.

Thus, the pawls 130 and 130 are maintained in a condition in which the outwardly-faced toothed portions 130a and 130a mesh with the inwardly-faced toothed portions 112a of the ratchet 110. Further, when the slide cam 140 is slid rightwardly, the hooks 144 and 144 of the slide cam 140 are hooked on engagement portions 131 and 131 formed in gate-shaped inside surfaces of the pawls 130 and 130, so that the pawls 130 and 130 can be pulled radially inwardly. As a result, the leg portions 132 and 132 of the pawls 130 and 130 positioned on the shoulder portions 142 and 142 are introduced into recessed portions 143 and 143 that are positioned left sides thereof, so that the pawls 130 and 130 can be disengaged from the ratchet 110.

The slide cam 140 described above can be slid rightwardly and leftwardly in the drawings when the hinge cam 150 is moved. The hinge cam 150 is disposed in a cam hole 141 that is formed through a central portion of the slide cam 140. The hinge cam 150 is rotatably positioned in the cam hole 141 that is formed through the central portion of the slide cam 140. Further, the hinge cam 150 is constantly rotationally biased counterclockwise in the drawings by a biasing force of the biasing spring 160 (the coil spring) that is attached between the hinge cam 150 and the guide 120. An inner end 161 of the biasing spring 160 is connected to an spring engagement portion 151. Conversely, the outer end 162 of the biasing spring 160 is connected to the spring engagement portion 126 of the guide 120.

Therefore, the hinge cam 150 can normally press the slide cam 140 from an inner surface side of the cam hole 141 by a projection 152 formed in an outer circumferential portion of the hinge cam 150, so as to slide the slide cam 140 leftwardly in the drawings. As a result, the leg portions 132 and 132 can be positioned on the shoulder portions 142 and 142 of the slide cam 140, so that the pawls 130 and 130 can be maintained in a locked condition in which the pawls 130 and 130 engage the ratchet 110.

The hinge cam 150 is integrally connected to the operating shaft (not shown) previously described. Therefore, when the operating shaft is rotated via an operation lever (not shown), the hinge cam 150 can be rotated clockwise against the biasing force of the biasing spring 160 described above. As a result, the slide cam 140 can be slid rightwardly in the drawings, so that the pawls 130 and 130 can be disengaged from the ratchet 110.

Next, with reference to FIG. 8 again, the retainer member 170 will be described. Similar to the retainer member 70 in Embodiment 1, the retainer member 170 is formed by forging a round rod-shaped forging material (Material: S10C or other such materials) and has a cylindrical shape in appearance. In particular, the retainer member 170 has a shouldered flange-shaped surface portion. The flange-shaped surface portion is formed in a back side end of the retainer member 170 so as to extend radially inwardly. As a result, a first annular bottom surface 171 and a second annular bottom surface 172 are formed in an inner circumferential surface of the retainer member 170. The first and second bottom surfaces 171 and 172 are respectively axially displaced in juxtaposition and may function as axially faced seat surfaces.

As shown in FIG. 9, when the ratchet 110 is axially inserted into a cylindrical interior of the retainer member 170, the first bottom surface 171 described above faces the outer disk surface of the ratchet 110 along an outer circumferential peripheral side thereof. Conversely, when the guide 120 is axially inserted into the cylindrical interior of the retainer member 170 after the ratchet 110 is inserted thereinto, the second bottom surface 172 faces an inner disk surface of the guide 120 along an outer circumferential peripheral side thereof.

Thus, the ratchet 110 and the guide 120 inserted into the cylindrical interior of the retainer member 170 can be axially positioned by the first bottom surface 171 and the second bottom surface 172 that are axially held thereagainst. Next, in a condition in which the ratchet 110 and the guide 120 are axially positioned, a reception side end periphery, i.e., a left end periphery, of the retainer member 170 is bent radially inwardly, so as to from an axially faced bent surface 174. Thus, the ratchet 110 and the guide 120 are coupled to each other via the retainer member 170, so as to be prevented from being axially separated from each other.

At this time, the reception side end periphery of the retainer member 170 is bent while a rear outer surface 173 is supported by a support die R. Further, the rear outer surface 173 corresponds to a rear side surface of the first bottom surface 171 that forms an end surface positioned opposite to the end periphery to be bent. The rear outer surface 173 has a radial width that correspond to the sum of a radial width of the first bottom surface 171 and a radial width of the second bottom surface 172 and is formed as an axially faced annular surface. Further, an outer circumferential surface of a cylindrical portion of the retainer member 170 is axially linearly extended from the reception side end periphery to an insertion direction side end periphery.

Thus, in the retainer member 170, the outer circumferential surface and the rear outer surface 173 described above is perpendicular to each other, and an inner area defined by these surfaces and the shouldered inner circumferential surface is solid in cross section. Therefore, a bending force can be applied to the reception side end periphery while the rear outer surface 173 having a wide radial width is supported by the support die R. Therefore, the reception side end periphery can be suitably bent.

Further, in the retainer member 170, as described above, because the inner area defined by the outer circumferential surface and the inner circumferential surface is solid in cross section, the flange-shaped surface portion that constitutes the rear outer surface 173 has an increased thickness. As a result, the flange-shaped surface portion having the increased thickness has increased rigidity and strength. That is, the flange-shaped surface portion has increased support rigidity and support strength to support the support die R. Therefore, the retainer member 170 cannot be easily deformed during a bending operation, so that the end periphery described above can be more suitably bent.

Thus, the end periphery of the retainer member 170 can be bent with a high degree of accuracy. Therefore, the bent end periphery of the retainer member 170 can be crimped against the outer disk surface of the guide 120 while a small clearance is formed between the outer disk surface of the ratchet 110 and the first bottom surface 171 of the retainer member 170, so that the ratchet 110 and the guide 120 can be integrated with a high degree of accuracy. That is, a clearance formed between the outer disk surface of the ratchet 110 and the first bottom surface 171 of the retainer member 170 can be prevented from being excessively widened, so that the ratchet 110 can be avoided from being rattled. Conversely, the clearance can be prevented from being excessively narrowed, so that relative rotation (slide rotation) of the ratchet 110 cannot be precluded.

Further, the flange-shaped surface portion described above has a plurality of projections 171a. that are projected from the first bottom surface 171. The projections 171a are circumferentially positioned at equal intervals. Therefore, the first bottom surface 171 can contact the outer disk surface of the ratchet 110 via point contact of the projections 171a. As a result, the ratchet 110 can be smoothly rotated.

Thus, the present invention has been described using two embodiments. However, various changes and modifications may be made to the present invention. For example, in the embodiments, the rotation prevention device of vehicle seat of the present invention is applied to the reclining device 4 and 104 that connects the seat back 2 to the seat cushion 3 such that the tilting angle of the seat back can be adjusted. However, the rotation prevention device can be applied to a device that is capable of connecting a tiltable seat back to a vehicle floor.

Further, the rotation prevention device can be applied to a device that is capable of rotatably connecting a vehicle seat to the vehicle floor. Further, the rotation prevention device can be applied to a device that is capable of tiltably connecting an ottoman supporting leg regions of a sitting person to the seat cushion 3 or the vehicle floor.

Further, the retainer member can be formed such that the inner area defined by the outer circumferential surface and the inner circumferential surface thereof is hollow. However, in such a case, when the reception side end periphery of the retainer member is bent, the retainer member can relatively be easily deformed compared with the structure in the embodiments described above. Therefore, it should be noted that accuracy of bending can relatively be reduced. In addition, in the embodiments, the outer circumferential surface of the retainer member is axially linearly extended from the reception side end periphery to the insertion direction side end periphery. However, the retainer member can be formed such that the outer circumferential surface partially has depressed portions. Also, the retainer member can be modified such that the outer circumferential surface thereof is axially obliquely extended.

In the reclining devices 4 and 104 of the embodiments described above, one of the connecting elements (the internal gear member 10 or the ratchet 110) and the other of the connecting elements (the external gear member 20 or the guide 120) are mutually supportively coupled so as to be rotated relative to each other. However, the connecting elements can be supportively coupled using a supporting member so as to be rotated relative to each other.

The invention claimed is:

1. A rotation prevention device of vehicle seat, comprising:
two connecting elements coupled to each other so as to be rotatable relative to each other, the connecting elements each having at least a disk-shaped portion, and
a retainer member that is capable of preventing the two connecting elements from being axially separated from each other,
wherein the two connecting elements are capable of being switched between a relatively rotatable condition and a relatively unrotatable condition depending on an operational condition of a rotation prevention mechanism disposed therebetween, wherein the retainer member has a shouldered cylindrical shape, so as to couple the two connecting elements having different diameters while circumferentially encircling at least a portion of the connecting elements, wherein the connecting elements are axially inserted into a cylindrical interior of the retainer member in order, so that one of the connecting elements that is inserted first faces a first bottom surface that is formed in an insertion direction side end periphery of the retainer member, and that the other of the connecting elements that is inserted later contacts a second bottom surface that is formed in the retainer member so as to be positioned closer to a reception side relative to the first bottom surface, wherein a reception side end periphery of the retainer member is bent radially inwardly while the connecting elements are coupled, so that the other of the connecting elements is integrated with the retainer member, and
wherein a rear side surface of the first bottom surface of the retainer member has a radial width that corresponds to the sum of at least a radial width of the first bottom surface and a radial width of the second bottom surface.

2. The rotation prevention device of vehicle seat as defined in claim 1, wherein an outer circumferential surface of a cylindrical portion of the retainer member is axially linearly extended from the reception side end periphery to the insertion direction side end periphery, and wherein an inner area defined by the linearly extended outer circumferential surface and an inner circumferential surface including the first and second bottom surfaces is solid in cross section.

* * * * *